Figure 6:
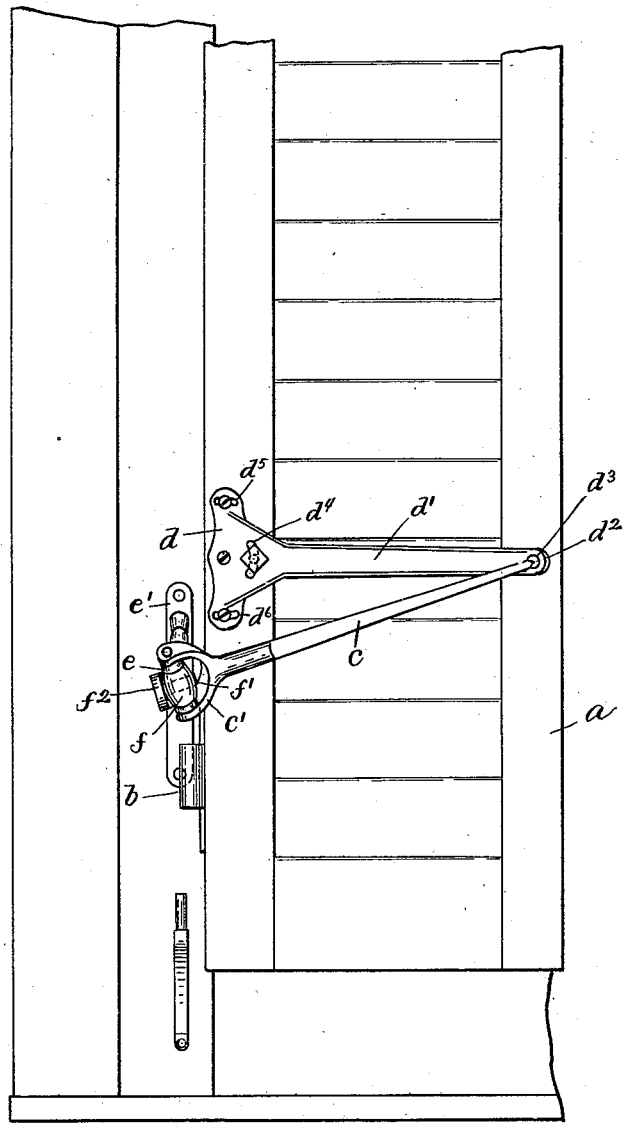

E. PRESCOTT.
SHUTTER OPERATING DEVICE.
APPLICATION FILED OCT. 17, 1910.
992,449.
Patented May 16, 1911.
4 SHEETS—SHEET 1.
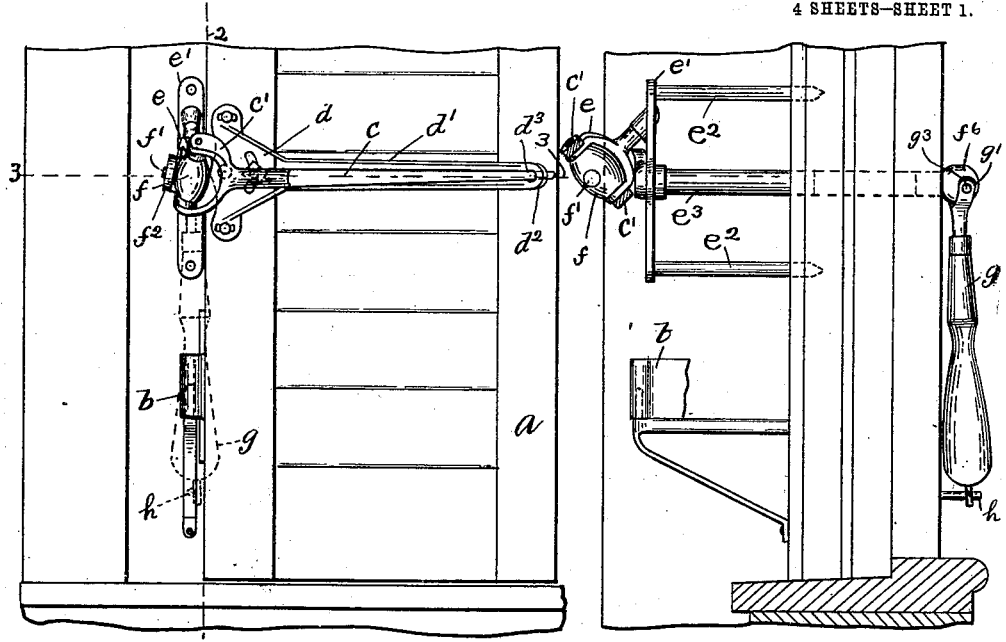
Fig. 1.   Fig. 2.
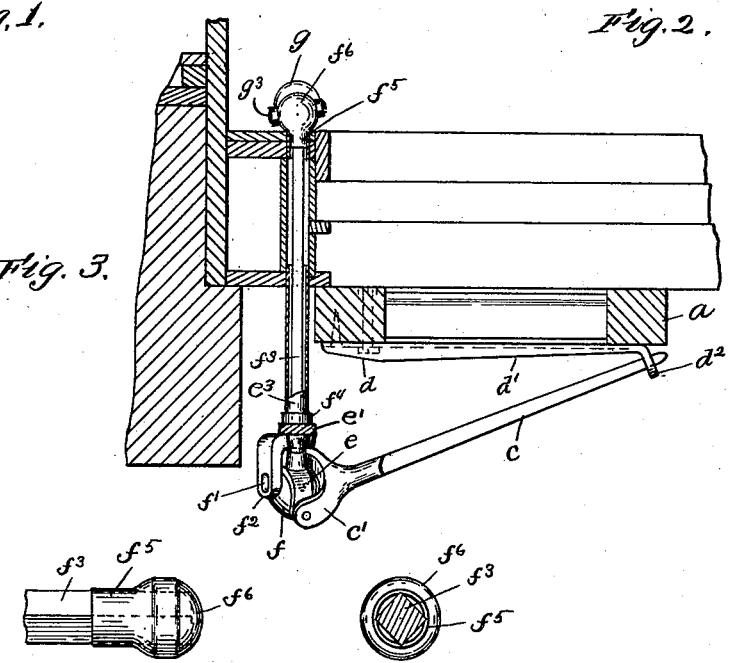
Fig. 3.
Fig. 4.   Fig. 5.
Witnesses:
H. B. Davis.
H. A. Best.
Inventor:
Edwin Prescott.
by Hayes & Harriman
attys.

E. PRESCOTT.
SHUTTER OPERATING DEVICE.
APPLICATION FILED OCT. 17, 1910.

992,449.

Patented May 16, 1911.

4 SHEETS—SHEET 2.

Witnesses:
H. B. Davis,
H. A. Best

Inventor;
Edwin Prescott.
by Hayes & Harriman
atty.

E. PRESCOTT.
SHUTTER OPERATING DEVICE.
APPLICATION FILED OCT. 17, 1910.
992,449.
Patented May 16, 1911.
4 SHEETS—SHEET 3.
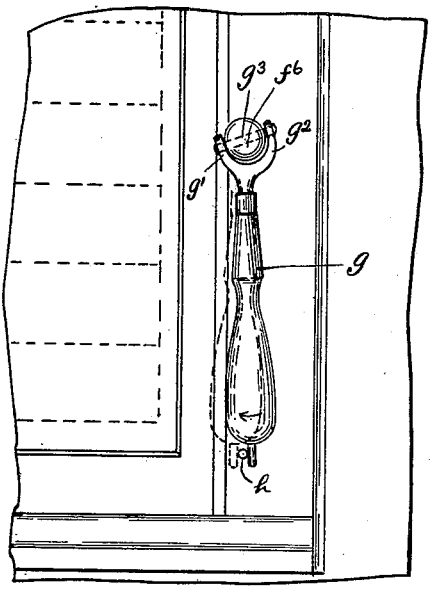
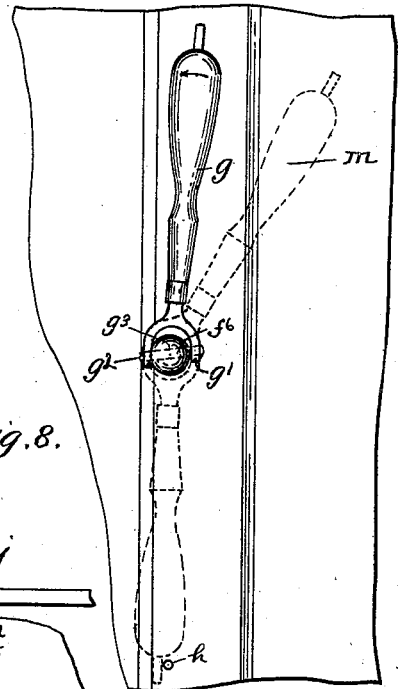
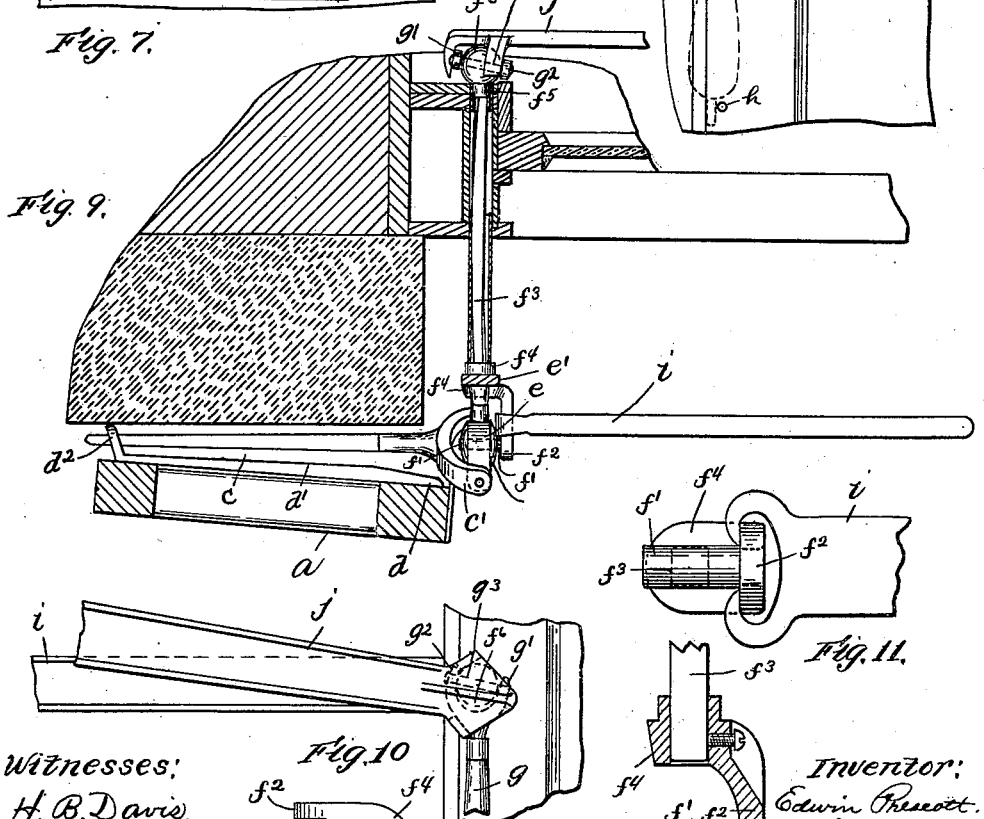
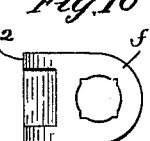
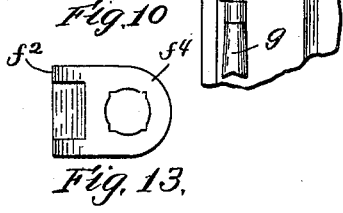
Witnesses:
H. B. Davis.
H. A. Best.
Inventor:
Edwin Prescott.
by Noyes & Harriman
atty.

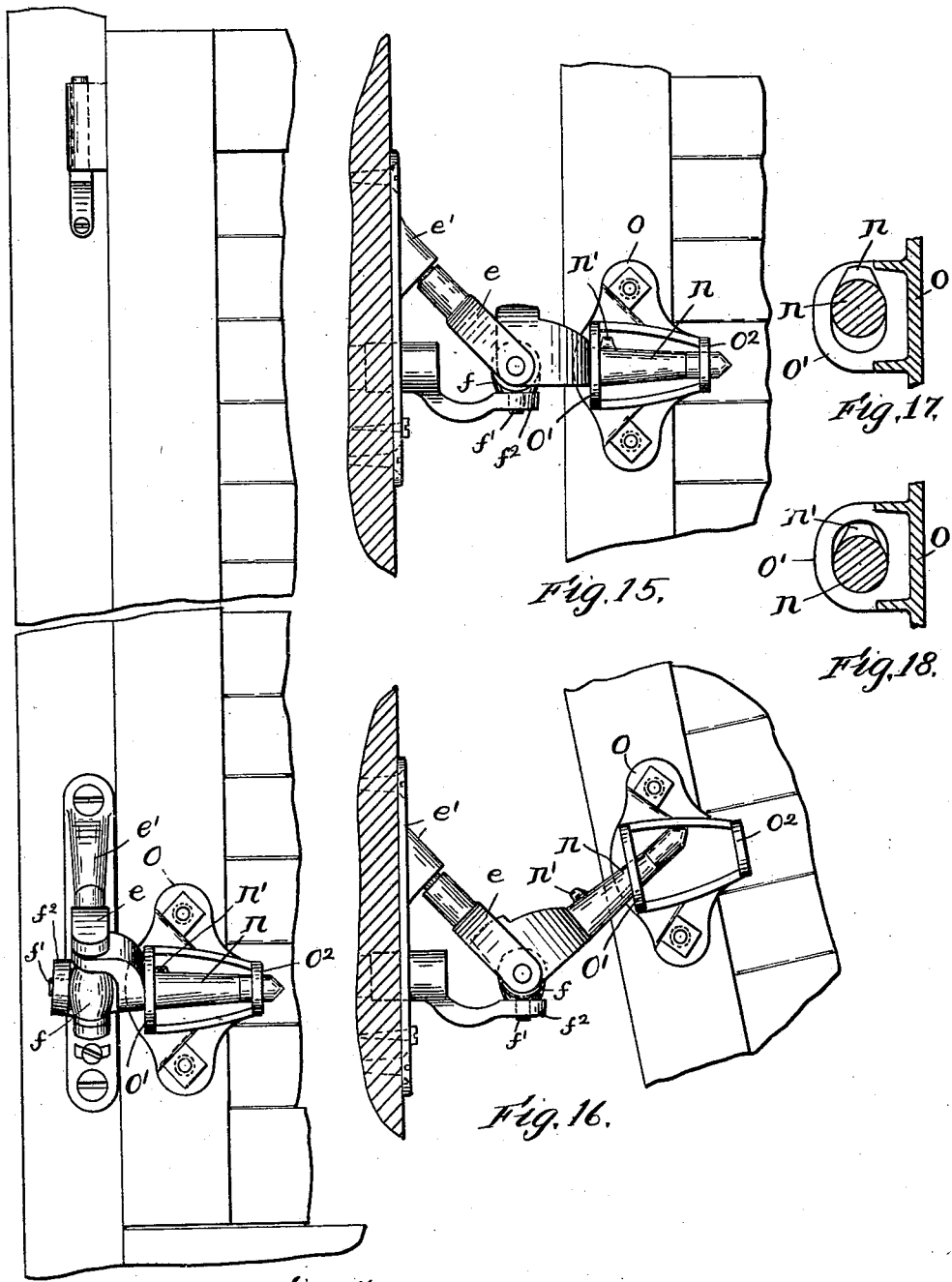

UNITED STATES PATENT OFFICE.

EDWIN PRESCOTT, OF ARLINGTON, MASSACHUSETTS.

SHUTTER-OPERATING DEVICE.

992,449.    Specification of Letters Patent.    Patented May 16, 1911.

Application filed October 17, 1910. Serial No. 587,394.

*To all whom it may concern:*

Be it known that I, EDWIN PRESCOTT, residing at Arlington, in the county of Middlesex and State of Massachusetts, have invented an Improvement in Shutter-Operating Devices, of which the following is a specification.

This invention relates to shutter-operators particularly adapted for operating an outside shutter from within a building without lifting the window-sash, and is intended as an improvement upon the shutter-operator shown in Letters Patent heretofore granted to me #816,881. In said patent the shutter is attached to a swinging-member by means connected with both of its stiles, and to detach the shutter from said swinging-member a tipping motion of the shutter about the upper hinge is required when the shutter is in a certain position.

One of the objects of the present invention is to provide a swinging-member and means connecting it with the shutter, so constructed as to permit the shutter to be swung about a vertical axis, yet require a vertical movement of the shutter to detach it from the swinging-member.

In one embodiment of my invention the shutter may be detached by a vertical movement only, and in any position it may occupy; and in another embodiment of my invention a vertical movement followed by a tipping movement is required.

Another object of the invention is to provide the turning-shaft with means rigidly connected to its ends, which may be engaged by suitable tools for the purpose of twisting the shaft to adjust it.

Another object of the invention is the arrangement of the pivotal connection of the operating-handle, whereby it may be moved into elevated position, to swing the shutter without materially changing its relative angle to the turning-shaft.

Another object of the invention is to fit shutters of different widths with a swinging-member arranged at the same angle from joint to connection with shutter, whereby the same handles may be employed for shutters of different widths. The shutter is held secure by the handle engaging a holding-pin, and another object of the invention is to provide for adjustment of the parts relative to each other, whereby the pressure of the handle on the holding-pin may be varied.

Figure 1 is a rear elevation of a shutter-operator embodying this invention. Fig. 2 is a vertical section taken on the dotted line 2—2, Fig. 1. Fig. 3 is a horizontal section taken on the dotted line 3—3, Fig. 2. Figs. 4 and 5 are details of the turning-shaft to be referred to. Fig. 6 is a rear elevation, the parts being moved to the positions they will occupy when lifting the shutter for the purpose of removing it. Fig. 7 is a front elevation, the operating-handle being in normal position. Fig. 8 is a detail showing the operating handle raised in the act of closing the shutter. Figs. 9, 10 and 11 are details showing the means for twisting the turning-shaft. Figs. 12 and 13 are details of the outer end portion of the turning-shaft. Fig. 14 is a rear elevation of a modified form of shutter-operator. Fig 15 is a side elevation of the form shown in Fig. 14, the shutter being half open. Fig. 16 is a view similar to Fig. 14, the shutter being partially removed. Figs. 17 and 18 are sectional details to be referred to.

Referring to Figs. 1 to 13, $a$ represents an ordinary form of shutter as made for a brick building adapted to swing about a vertical axis, and $b$ the lower hinge; although my invention is applicable to other forms of shutters. The swinging-member here shown for illustrating one embodiment of my invention, consists of a bar $c$, having a yoke $c'$ at its inner end for connection with the operating-means, its opposite or outer end being free. The connection of said bar with the operating-means is such as to permit movement of the bar in a horizontal plane and also in a vertical plane about the operating-means as a center, as will be hereinafter described. As a means for removably attaching the shutter to said swinging-member, whereby it will require a vertical movement to detach it, yet permitting the shutter to be swung about a vertical axis, a plate $d$ is attached to the outside of the inner stile of the shutter or thereabout having an arm $d'$ extended from it in a horizontal direction, and the extremity of said arm $d'$ is extended outward, in a direction away from the face of the shutter, as represented at $d^2$, Fig. 3, and said outwardly extended portion $d^2$ has a hole $d^3$ through it, made larger in diameter than the bar $c$, to receive the outer end of said bar and permit of a sliding, a rotary and also a tipping movement of the bar in said hole. The plate $d$ bearing the arm $d'$ is arranged approximately in the same plane with the swinging-member, see Fig. 1, and the outer or free end of the bar $c$ of the swinging-member projects through the hole $d^3$ in the end portion $d^2$ of the arm, and said end portion $d^2$ is preferably disposed at right angles to the bar $c$, so that as the swinging-member is swung in a horizontal plane about a vertical axis the shutter will be correspondingly moved, and when thus moved the bar $c$ will slide freely in and out of the hole $d^3$. As the arm $c$ is not only adapted to be moved in a horizontal plane to swing the shutter, but also to be moved in an upward direction, about the operating-means as a center, as represented in Fig. 6, in any position it may occupy, for the purpose of removing the shutter, and as the only connection between the shutter and the swinging-member is a sliding one, the shutter may be disconnected from the swinging-member in any position it may occupy by simply lifting it from its hinges bodily in a vertical direction. Such vertical movement of the shutter operates to withdraw the arm $d'$ from the bar $c$. As the shutter is lifted bodily in a vertical direction, in any position it may occupy, the swinging-member will be moved in a vertical plane about a horizontal axis, the bar $c$ being moved angularly with respect to the arm $d'$, and the free end of said bar will be tipped in the hole $d^3$ in the arm until the arm is withdrawn from its sliding connection with the bar, as represented in Fig. 6. Thus no tipping or tilting motion of the shutter is required to remove it but a vertical motion is required.

The bar $c$ is made a little longer than the plate $d$ and arm $d'$ thereon; and for a brick building said plate and arm are made quite long and may extend well across the shutter, especially if the shutter is narrow, and for a wooden building said plate and arm are made quite short, as shown in Fig. 14.

The inner end of the swinging-member is pivotally connected to a yoke $e$, swiveled to a frame $e'$ which is secured to the window casing, and said yoke $e$ is arranged to turn on an axis inclined to the plane of swinging movement of the swinging-member, and said yoke $e$ is made smaller than the yoke $c'$ on the swinging-member to enter the space between the arms of said yoke $c'$, and the pivotal connections extend through the arms of the yokes.

For the purpose of turning the swiveled yoke $e$ to in turn swing the member $c$, a center piece $f$ is arranged between the arms of said yoke $e$, which is pivotally connected thereto at its ends, as for instance, the pivot-pins connecting the arms of the yoke $e$ with the arms of the yoke $c'$ may extend into the ends of said center piece; and said center piece has a hole through it transversely, midway its length, which receives loosely a pin $f'$, which is attached to and extended laterally from an ear $f^2$, which is secured to the outer end of the turning-shaft $f^3$, which latter extends through the wall of the building and has attached to its inner end an operating-handle $g$. A double universal joint is thus produced between the turning-shaft $f^3$ and the swinging-member $c$, and any movement of the handle $g$ operating to turn the shaft $f^3$, will also swing the member $c$ and thereby open or close the shutter.

The frame $e'$ is designed to be supported well forward of the casing and for the purpose of thus supporting it and also as a means of attaching it to the casing easily and quickly, end posts $e^2$, $e^2$, are provided on the frame $e'$ at the opposite ends thereof, which have chisel-pointed ends adapting them to be driven into the casing without splitting the material of the casing. The provision of chisel-pointed end posts obviates the necessity of boring holes in the casing for the posts. The frame $e'$ also has a center-tube $e^3$ which extends a short distance into the casing. The turning-shaft $f^3$, as here shown, consists of a square bar of suitable length to extend through the wall. Its outer end is contained in a squared socket in the base $f^4$ of the ear $f^2$, and is secured thereto by a set-screw or other means, see Figs. 12 and 13. Its inner end is driven into a socket in the stem $f^5$ of an end-piece $f^6$, see Figs. 4 and 5, to thereby rigidly secure the bar and end-piece together. The socket in the stem $f^5$ is made cylindrical and has V-shaped grooves to receive the corners of the bar, thus preventing relative movements of the bar and end-piece rotarily. The operating-handle $g$ is pivotally connected with the end-piece $f^6$ by a pivot-pin extended through said end-piece. In my aforesaid patent said handle has ears $g'$, $g^2$, embracing the end-piece $f^6$, and a pivot-pin $g^3$ extends through both ears and the end-piece, and one of said ears, as $g^2$, is made longer than the other, so that the pivot-pin which extends through the end-piece is inclined to a horizontal when the handle is in vertical position, see Fig. 7. Such construction permits the handle, when depending, to occupy a position a short distance at one or the other side of a fastening-pin $h$, thus requiring a supplemental movement of the handle to the right or to the left, to pass by and thereby engage the fastening-pin. When lifting the handle $g$, thus pivotally connected to the turning-shaft into its elevated position, as shown by dotted lines at $m$, Fig. 8, for the purpose of subsequently swinging it to the left to rotate the turning-shaft $f^3$, and close the shutter, said handle will be moved to the right of a vertical position owing to the ears $g'$, $g^2$ being of unequal length and such lateral movement of the handle is objectionable, owing to its approaching too near the window-casing, and herein it is desired to overcome this objection, and to accomplish this result the pivot-pin $g^3$ of the handle $g$, which has heretofore been arranged at right angles to the turning-shaft and at an inclination to the handle, is arranged at an inclination to said shaft and also at an inclination to the handle, as represented in Fig. 3, and when thus arranged the handle may be lifted without approaching too near the casing, as represented by full lines Fig. 8. As illustrating the difference incident to the employment of this feature of my invention, in Fig. 8, the full lines represent my angularly supported handle in elevated position, and the dotted lines at the right of said full lines represent the handle in the position it will occupy as heretofore supported. The pivot-pin $f^6$ of the handle is thus arranged at an inclination to the handle and also at an inclination to the turning-shaft.

Heretofore, for the purpose of twisting the turning-shaft $f^3$ in order to adjust it, whereby the handle $g$ is caused to occupy a position the same distance at opposite sides of the holding-pin $h$, when the shutter is opened and closed, said shaft has been removed, twisted by suitable mechanical appliances and then replaced. Herein, having rigidly secured the ear $f^2$ to one end of the shaft and the end-piece $f^6$ to the other end thereof, employing a square shaft which enters square sockets in said ear and end-piece, whereby they are both held from movement rotarily with respect to the shaft, suitable tools, such as $i$ and $j$, may be employed to engage said ear and end-piece, as represented in Figs. 9, 10 and 11, and while in engagement therewith, one tool may be held in fixed position and the other moved to thereby twist the shaft while the parts are assembled. The turning-shaft may be twisted with precision and greater accuracy of adjustment obtained, as well as the adjusting operation greatly facilitated. To vary or adjust the pressure of the handles on the holding-pin the plate $d$ is made adjustable on the shutter, and, as here shown, said plate has curved slots $d^4$, $d^5$, $d^6$, or equivalent enlarged holes, see Fig. 6, for the attaching-screws which admit of a short range of adjustment.

Referring to Figs. 14 to 18 showing another embodiment of my invention, the swinging-member $n$ is made quite short, and has a lug $n'$ projecting from it, and the plate $o$, which is attached to the inner stile of the shutter is made short and has two ears $o'$ and $o^2$, for the swinging-member $n$, and the hole in the ear $o'$ is made oblong, see Figs. 17 and 18; and normally the plate rests on the swinging-member, as shown in Fig. 17, with the lug at the side of the ear; and when it is desired to remove the shutter it is swung half-way open, whereupon the lug is brought in line with the oblong hole in the ear by a turning movement of the swinging-member, and then the shutter is bodily lifted in a vertical direction as represented in Fig. 18, and then tipped, as shown in Fig. 16. Thus, in this embodiment of my invention it is necessary to raise the shutter for the purpose of removing it, although the final act of removal is a tipping motion. Unless the swinging-member and attaching-plate on the shutter are so constructed as to require a vertical movement to remove the shutter there is liability of the shutter being removed when swung back and forth, particularly when considerable force is exerted.

I claim:—

1. In a shutter-operator, a swinging-member movable in a horizontal plane to swing the shutter and in a vertical plane to permit disconnection of the shutter therefrom, means for moving said member in a horizontal plane which permits movement thereof in a vertical plane, and connections between said member and the shutter permitting movement of the shutter about a vertical axis to open and close and permitting a vertical movement thereof to disconnect it from said member, substantially as described.

2. In a shutter-operator, a swinging-member comprising a bar, operating-means to which the inner end of said bar is connected and by which said bar is moved in a horizontal plane to swing the shutter, said means permitting movement of the bar in a vertical plane, to permit disconnection of the shutter therefrom, and connections between said swinging-member and the shutter permitting movement of the shutter about a vertical axis and also in a vertical direction, substantially as described.

3. In a shutter-operator, a swinging-member comprising a bar, operating-means to which the inner end of said bar is connected and by which said bar is moved in a horizontal plane to swing the shutter, said means permitting movement of the bar in a vertical plane to permit disconnection of the shutter therefrom, and means arranged on the shutter with which said bar is slidably connected permitting movement of the shutter about a vertical axis and also in a vertical direction, substantially as described.

4. In a shutter-operator, a swinging-member comprising a bar, operating-means to which the inner end of said bar is connected and by which said bar is moved in a horizontal plane, said means permitting movement of said bar in a vertical plane for disconnection of the shutter therefrom, a plate secured to the shutter having an outwardly extended arm with a hole through its extremity, through which the free end of said bar projects, said hole being made large enough to permit free movement of the bar therein, substantially as described.

5. In a shutter-operator, a square turning-shaft, an end-piece having a squared-socket to receive the inner end of said shaft, and an ear having a base with a squared socket to receive the outer end of said shaft, whereby its parts are held against rotary movement with respect to each other, a swinging-member connected with a shutter, and a universal joint connecting said swinging-member with said ear, and means connected with the inner end of the turning-shaft for turning it, substantially as described.

6. In a shutter-operator, a swinging-member connected with a shutter, a turning-shaft connected with said swinging-member, a handle having ears of unequal length connected with said turning-shaft by a pivot-pin which is arranged at an inclination to the handle and also at an inclination to the turning-shaft, whereby the position of the handle may be reversed with respect to the turning-shaft without materially altering its relative angular position with respect thereto, substantially as described.

7. In a shutter-operator, an operating-handle adapted to engage a holding-pin, a turning-shaft to which said handle is connected, a swinging-member connected with said turning-shaft, a plate attached to the shutter to which said swinging-member is connected, and adjusting-means for said plate, whereby the pressure of the handle on the holding-pin may be varied, substantially as described.

In testimony whereof, I have signed my name to this specification in the presence of two subscribing witnesses.

EDWIN PRESCOTT.

Witnesses:
B. J. NOYES,
H. B. DAVIS.

Copies of this patent may be obtained for five cents each, by addressing the "Commissioner of Patents, Washington, D. C."